UNITED STATES PATENT OFFICE.

ROBERT M. DONOVAN, OF PORTLAND, OREGON.

COMPOUND FOR COLORING BROOM-CORN.

SPECIFICATION forming part of Letters Patent No. 444,229, dated January 6, 1891.

Application filed May 2, 1890. Serial No. 350,369. (No specimens.)

*To all whom it may concern:*

Be it known that I, ROBERT M. DONOVAN, a citizen of the United States, residing at Portland, in the county of Multnomah and State of Oregon, have invented certain new and useful Improvements in Compounds for Treating or Coloring Broom-Corn; and I do hereby declare the following to be a full, clear, and exact description of said invention, such as will enable others skilled in the art to which it most nearly appertains to make, use, and practice the same.

My invention relates to certain new and useful improvements in compounds for treating broom-corn, as will be hereinafter more fully set forth and described.

My invention consists in adding or mixing to any suitable coloring compound a weak solution of sulphuric or other destructive acids for the purpose of toughening and preparing the fiber of the corn to better receive and retain the coloring compound.

While any suitable coloring or dyeing compound may be employed, I prefer to use a compound consisting of about thirty (30) gallons of heated water, two (2) ounces of green aniline, one (1) ounce of burnt alum, more or less, according to the depth of tinge desired, and to this a weak solution of sulphuric or other destructive acid in contradistinction to acetic or vinegar acid. These ingredients are thoroughly mixed, and when mixed in about the proportion above specified will suffice to color about six hundred (600) pounds of broom-corn. By the employment of a weak solution of sulphuric or other destructive acids in the compound, the corn is strengthened and toughened and rendered more susceptible to the action of the coloring compound.

Heretofore in order to make the coloring compound penetrate thoroughly into the broom-corn, the latter had to be subjected to the action of the fumes of sulphur, which, besides being extremely dangerous to the worker's health, destroyed the roof of the building wherein the fuming operation had to be conducted. However, by applying the destructive acid directly within the compound I accomplish the same and better result without the danger and annoyance heretofore attendent thereon.

By the use of a compound combined with a solution of destructive acid the corn may be submitted to the action thereof, and thus be colored either before or after being made into brooms.

Having thus described my invention, what I claim as new, and desire to secure protection in by Letters Patent of the United States, is—

A coloring composition for broom-corn, consisting of green aniline, burnt alum, water, and sulphuric acid, substantially as set forth.

In testimony whereof I have hereunto affixed my signature in the presence of witnesses.

ROBT. M. DONOVAN.

In presence of—
FRANCIS M. STREET,
A. D. MACKENZIE.